United States Patent
Cho et al.

(10) Patent No.: US 9,323,104 B2
(45) Date of Patent: Apr. 26, 2016

(54) LIQUID CRYSTAL DISPLAY APPARATUS

(71) Applicant: Samsung Display Co., Ltd., Yongin (KR)

(72) Inventors: Joo Woan Cho, Asan-si (KR); Sangheon Ye, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 453 days.

(21) Appl. No.: 13/835,531

(22) Filed: Mar. 15, 2013

(65) Prior Publication Data
US 2014/0111735 A1    Apr. 24, 2014

(30) Foreign Application Priority Data
Oct. 23, 2012  (KR) .................. 10-2012-0118023

(51) Int. Cl.
*G02F 1/1333*    (2006.01)
*G02F 1/1335*    (2006.01)

(52) U.S. Cl.
CPC .... *G02F 1/133608* (2013.01); *G02F 1/133606* (2013.01); *G02F 2201/465* (2013.01); *G02F 2201/54* (2013.01); *Y10T 29/49002* (2015.01)

(58) Field of Classification Search
CPC ................. G02F 1/133602; G02F 1/133604; G02F 1/133608; G02F 1/133606; G02F 1/133605; G02F 1/133308; G02F 1/133603; G02F 1/133615; G02F 1/133504; G02F 1/133524; G02F 1/133526; G02F 1/1336; G02F 2201/465; G02F 2201/46; G02F 2201/503; G02F 2201/50; G02F 2001/133314; G02F 2001/133322; G02F 2001/133317; G02F 2001/133325; F21V 19/009; F21V 19/0085; F21V 15/041; G02B 6/0025; G02B 6/0028; G02B 6/0031; G02B 6/0051; G02B 6/0073

USPC .................. 362/97.1, 97.2, 235, 382, 217.05, 362/217.16, 217.02, 217.11, 217.14, 217.1, 362/217.15, 296.01, 362, 368, 432, 581, 362/612, 613, 97.3, 97.4; 349/61, 58, 62, 349/64, 65, 67; 348/794, 836; 345/87, 84; 257/99

See application file for complete search history.

(56) References Cited

U.S. PATENT DOCUMENTS

| | | | |
|---|---|---|---|
| 6,504,586 B1 | 1/2003 | Lee | |
| 6,552,761 B1 | 4/2003 | Seo et al. | |
| 8,031,289 B2 | 10/2011 | Naritomi | |
| 2002/0080298 A1* | 6/2002 | Fukayama | G02F 1/133308 349/58 |
| 2008/0143918 A1* | 6/2008 | Kim | G02F 1/133608 349/58 |
| 2009/0316062 A1* | 12/2009 | Nishizawa | G02F 1/33305 349/58 |

FOREIGN PATENT DOCUMENTS

| | | |
|---|---|---|
| JP | 2010-073389 | 4/2010 |
| JP | 2010-123398 | 6/2010 |

(Continued)

*Primary Examiner* — Thoi Duong
(74) *Attorney, Agent, or Firm* — H.C. Park & Associates, PLC

(57) ABSTRACT

A liquid crystal display apparatus includes a display panel that displays an image, a backlight unit that provides a light to the display panel, and a frame that accommodates the display panel and the backlight unit. The backlight unit includes a light source that emits the light, a diffusion plate that diffuses the light from the light source, an optical sheet that condenses the diffused light and provides the condensed light to the display panel, and a clip that couples the diffusion plate and the optical sheet.

19 Claims, 10 Drawing Sheets

(56) References Cited

FOREIGN PATENT DOCUMENTS

| | | |
|---|---|---|
| JP | 2010-192301 | 9/2010 |
| KR | 10-0188120 | 3/1998 |
| KR | 10-2007-0057497 | 6/2007 |
| KR | 10-2008-0022821 | 3/2008 |
| KR | 10-2010-0123530 | 11/2010 |

* cited by examiner

LIQUID CRYSTAL DISPLAY APPARATUS

CROSS-REFERENCE TO RELATED APPLICATION

This application priority from and the benefit of Korean Patent Application No. 10-2012-0118023, filed on Oct. 23, 2012, which is hereby incorporated by reference for all purposes as if fully set forth herein.

BACKGROUND

1. Field of the Invention

Exemplary embodiments of the present invention relate to a liquid crystal display.

More particularly, the present invention relates to a liquid crystal display apparatus capable of preventing an optical sheet from being wrinkled.

2. Description of the Background

In recent years, various display apparatuses, such as a liquid crystal display apparatus, an organic light emitting diode display apparatus, an electrowetting display apparatus, a plasma display panel apparatus, and an electrophoretic display apparatus have been developed.

Among them, the liquid crystal display apparatus typically includes a display panel including two substrates and a liquid crystal layer disposed between the two substrates and a backlight unit providing light to the display panel. The liquid crystal display apparatus is manufactured to have a flat shape, but in recent years the liquid crystal display apparatus has been developed to have a curved shape.

The backlight unit can be classified into an edge illumination type and a direct illumination type. The edge illumination type backlight unit includes a light source emitting the light, a diffusion plate diffusing the light from the light source, and an optical sheet disposed on the diffusion plate. Different from the diffusion plate having rigidity, the optical sheet is a very thin and easily bent. That is, the optical sheet is easily deformed by external impacts. When the optical sheet is formed of a resin material, the optical sheet is easily expanded or contracted by heat. As a result, the optical sheet may become wrinkled.

Therefore, there is a need for an approach to solve the above problems.

SUMMARY

These and other needs are addressed by the present invention, in which exemplary embodiments provide a liquid crystal display apparatus capable of preventing an optical sheet from being wrinkled, bent, expanded, or contracted.

Additional features of the invention will be set forth in the description which follows, and in part will be apparent from the description, or may be learned by practice of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

Exemplary embodiments of the present invention disclose a display apparatus. The display apparatus includes a display panel to display an image. The display apparatus also includes a backlight unit to provide a light to the display panel. The display apparatus includes a frame to accommodate the display panel and the backlight unit. The backlight unit includes a light source. The backlight unit also includes a diffusion plate to diffuse the light from the light source. The backlight unit also includes an optical sheet to condense the diffused light and to provide the condensed light to the display panel. The backlight unit includes a clip to couple the diffusion plate and the optical sheet.

Exemplary embodiments of the present invention disclose a method. The methods includes disposing a display panel, a backlight unit, and a frame, the frame accommodating the display panel and the backlight unit, wherein the backlight unit comprises a light source, a diffusion plate, an optical sheet, and a clip. The method also includes forming a plurality of protrusions to a top portion or a bottom surface of the diffusion plate in an outward direction, the diffusion plate having a structural rigidity. The method includes forming the optical sheet having a plurality of engaging holes and the engaging holes are disposed adjacent to an end portion of the optical sheet, wherein the protrusions are formed respectively correspond to the engaging holes and are disposed on upper side surface and the lower side surface of the diffusion plate to be spaced apart from each other, and wherein the engaging holes are disposed on the top portion and a bottom portion of the optical sheet to be spaced apart from each other. The method includes disposing a clip to couple the diffusion plate and the optical sheet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

An apparatus, method, and software for manufacturing a liquid crystal display (LCD) capable of preventing an optical sheet from being wrinkled, bent, expanded, or contracted are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Hereinafter, exemplary embodiments of the present invention will be explained in detail with reference to the accompanying drawings.

Figure 1:
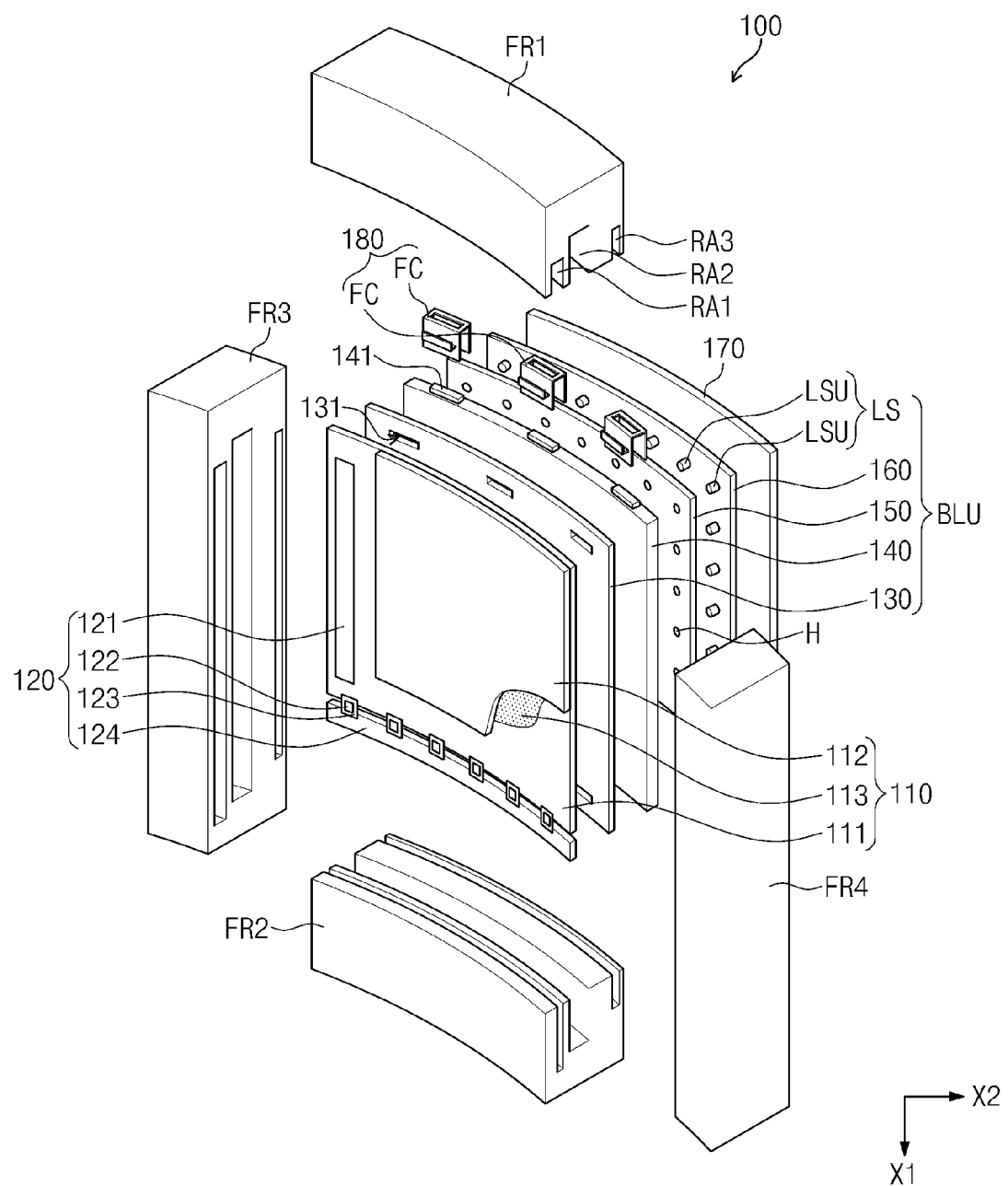
FIG. 1 is a perspective view showing a liquid crystal display apparatus according to exemplary embodiments of the present invention.

FIG. 1 is a perspective view showing a liquid crystal display apparatus according to exemplary embodiments of the present invention.

FIG. 1 shows the liquid crystal display apparatus having a curved shape, but the liquid crystal display apparatus should not be limited to the curved shape. That is, the liquid crystal display apparatus may be a flat panel display apparatus.

Referring to FIG. 1, the liquid crystal display apparatus 100 may include a display panel 110, a driver 120, a backlight unit BLU, a bottom plate 170, a clip 180, and frames FR1 to FR4.

The display panel 110 may have a curved shape or a flat shape. The display panel 110 may be manufactured to have a flat shape, but the display panel 110 can be a curved shape by the other members, e.g., frames having the curved shape. In this example, the display panel 110 has flexibility. In another example, the display panel 110 may be manufactured to have the curved shape from the beginning of the process. The display panel 110 having the curved shape has the flat shape in a first direction X1 and has a predetermined curvature in a second direction X2 crossing the first direction X1. Accordingly, left and right end portions of the display panel 110 are substantially in parallel to each other, and upper and lower end portions of the display panel 110 are substantially in parallel to each other and have the curved shape in the second direction X2 crossing the first direction X1.

The display panel 110 may include a first substrate 111 on which a plurality of pixels (not shown) are disposed, a second substrate 112 on which a common electrode (not shown) may be disposed, and a liquid crystal layer 113 may be interposed between the first substrate 111 and the second substrate 112. The first substrate 111 and the second substrates 112 face each other.

The first substrate 111 may include a plurality of pixel electrodes (not shown) respectively corresponding to the pixels and a plurality of thin film transistors (not shown) each connected to a corresponding pixel electrode of the pixel electrodes. Thin film transistors receive data voltages in response to gate signals and provide the data voltages to the pixel electrodes. When the data voltages are applied to the pixel electrodes and the common electrode is applied with a common voltage, an arrangement of liquid crystal molecules of the liquid crystal layer 113 is changed. According to the change of the arrangement of the liquid crystal molecules, a transmittance of the light provided from the backlight unit BLU to the liquid crystal layer 113 is controlled, thereby displaying a desired image.

The driver 120 may include a gate driver 121, a plurality of source driver chips 122, a plurality of flexible printed circuit boards 123 respectively corresponding to the source driver chips 122, and a driving circuit board 124. The source driver chips 122 form a data driver.

The gate driver 121 may be mounted on a left end portion of the display panel 110 in an amorphous silicon TFT gate driver circuit (ASG) form. The gate driver 121 generates the gate signals in response to a gate control signal provided from a timing controller (not shown) mounted on the driving circuit board 124. The gate signals are sequentially applied to the pixels in the unit of row.

The source driver chips 122 may be mounted on the flexible printed circuit boards 123, respectively, and connected between the driving circuit board 124 and a lower portion of the first substrate 111 of the display panel 110. For example, the source driver chips 122 may be mounted on the flexible printed circuit boards 123 in a tape carrier package (TCP) method. However, the source driver chips 122 may be mounted on the lower portion of the first substrate 111 of the display panel 110 in a chip-on-glass (COG) method.

The source driver chips 122 receive image signals and a data control signal from the timing controller mounted on the driving circuit board 124. The source driver chips 122 generate analog data voltages corresponding to the image signals in response to the data control signal. The data voltages are applied to the pixels.

The backlight unit BLU may be disposed at a rear side of the display panel 110 to provide the light to the display panel 110. As described above, the transmittance of the light provided to the display panel 110 is controlled so at to display the desired image.

The backlight unit BLU may include an optical sheet 130, a diffusion plate 140, a reflective sheet 150, a light source board 160, and a light source LS. The light source LS may include a plurality of light source units LSU to emit the light.

The optical sheet 130 of the backlight unit BLU may be disposed at the rear side of the display panel 110.

In some examples, the optical sheet 130 may include a plurality of first engaging holes 131 formed there through and the engaging holes 131 may be disposed adjacent to end portions of the optical sheet 130. The first engaging holes 131 of the optical sheet 130 may be disposed at upper and lower portions of the optical sheet 130 and may be arranged in a row direction of the optical sheet 130 when viewed in a plan view. For example, the first engaging holes 131 of the optical sheet 130 may be spaced apart from each other at regular intervals in each of the upper and lower portions of the optical sheet 130. The first engaging holes 131 may be formed through predetermined portions in each of the upper and lower portions of the optical sheet 130 when viewed in a plan view.

A number of the first engaging holes 131 formed through the upper portion of the optical sheet 130 may be equal to a number of the first engaging holes 131 formed through the lower portion of the optical sheet 130. FIG. 1 shows three first engaging holes 131 formed through the upper portion of the optical sheet 130. For example, three engaging holes 131 may also be formed through the lower portion of the optical sheet 130. In addition, the number of the first engaging holes 131 should not be limited to three. Further, the upper and lower portions of the optical sheet 130 can have different numbers of first engaging holes 131.

The optical sheet 130 may be thinner than the diffusion plate 140, thus is susceptible to being bent. That is, the optical sheet 130 is easily deformed by external forces. For instance, the optical sheet 130 is expanded or contracted by heat. Accordingly, the optical sheet 130 is bent in the curved shape as the display panel 110.

Although not shown in FIG. 1, the optical sheet 130 may include a diffusion sheet, a prism sheet disposed on the diffusion sheet, and a protective sheet disposed on the prism sheet. The diffusion sheet diffuses the light exiting from the diffusion plate 140. The prism sheet condenses the light diffused by the diffusion sheet to allow the light to travel in a direction substantially vertical to the display panel 110. The light exiting from the prism sheet is vertically incident into the display panel 110. The protective sheet protects the prism sheet from external impacts.

The diffusion plate 140 may be disposed at the rear side of the optical sheet 130. The diffusion plate 140 may include a diffusion agent dispersed therein or coated thereon. The diffusion plate 140 has rigidity, and thus the diffusion plate 140 is not easily bent. The diffusion plate 140 may be formed to have the curved shape as the display panel 110.

The diffusion plate 140 may include a plurality of protrusions 141 outwardly protruded from a side surface vertical to a boundary of a plane surface thereof. The plane surface of the diffusion plate 140 may be a front surface facing the optical sheet 130 or a rear surface facing the light source units LSU. The protrusions 141 are disposed on an upper side surface and a lower side surface of the diffusion plate 140. For example, the protrusions 141 may be spaced apart from each other at regular intervals on each of the upper and lower surfaces of the diffusion plate 140. The protrusions 141 correspond to the first engaging holes 131, respectively.

A number of the protrusions 141 disposed on the upper side surface of the diffusion plate 140 may be equal to a number of the protrusions 141 disposed on the lower side surface of the diffusion plate 140. In FIG. 1, three protrusions 141 formed on the upper side surface of the diffusion plate 140 are exemplarily shown, but three protrusions 141 may be formed on the lower side surface of the diffusion plate 140. In addition, the number of the protrusions 141 should not be limited to three. Further, the number of the protrusions 141 disposed on the upper side surface of the diffusion plate 140 may differ from the number of the protrusions 141 disposed on the lower side surface of the diffusion plate 140. The protrusions 141 may be inserted into fixing clips FC, respectively. The diffusion plate 140 diffuses the light provided from the light source units LSU.

The reflective sheet 150 may be disposed at the rear surface of the diffusion plate 140. The reflective sheet 150 is provided with a plurality of holes H formed therethrough. The light source board may be disposed at the rear side of the reflective sheet 150. The light source units LSU may be disposed on the light source board 160. The light source units LSU may be inserted into the holes H, respectively. The light source units LSU are configured to include light emitting diodes, but they should not be limited to the light emitting diodes. That is, the light source units LSU may be configured to include fluorescent lamps. The light source units LSU may be arranged in a matrix form. The reflective sheet 150 reflects the light provided from the light source units LSU to allow the light to travel to the diffusion plate 140.

The bottom plate 170 may be disposed at the rear side of the light source board 160. The bottom plate 170 accommodates the backlight unit BLU in cooperation with the frames FR1 to FR4. The reflective sheet 150, the light source board 160, and the bottom plate 170 have the curved shape as the display panel 110.

According to exemplary embodiments, the backlight unit BLU may be a direct illumination type backlight unit in which the light source units LSU may be disposed under the display panel 110 to provide the light to the display panel 110, but it should not be limited thereto or thereby. That is, the backlight unit BLU may be an edge illumination type backlight unit in which the light source units LSU may be disposed at a side portion of the display panel 110 to provide the light to the display panel 110.

The clip 180 couples the diffusion plate 140 to the optical sheet 130. The clip 180 may include the fixing clips FC. The fixing clips FC correspond to the protrusions 141 of the diffusion plate 140, respectively. In addition, the fixing clips FC correspond to the first engaging holes 131 of the optical sheet 130, respectively. In FIG. 1, three fixing clips FC disposed at the upper portion of the backlight unit BLU are exemplarily shown, but three fixing clips FC may also be disposed at the lower portion of the backlight unit BLU. In addition, the number of the fixing clips FC should not be limited to three.

Each of the fixing clips FC may be coupled to a corresponding protrusion of the protrusions 141 and a corresponding first engaging hole of the first engaging holes 131. The diffusion plate 140 may be coupled to the fixing clips FC and the optical sheet 130 may be coupled to the fixing clip FC coupled to the diffusion plate 140. Accordingly, the optical sheet 130 may be fixed by the fixing clips FC. The fixing clips FC will be described in detail with reference to FIGS. 2A and 2B. The connection between the fixing clips FC, the diffusion plate 140, and the optical sheet 130 will be described in detail with reference to FIGS. 3A and 3B.

The frames FR1 to FR4 accommodate the display panel 110 and the backlight unit BLU therein. For instance, the frames FR1 to FR4 are extended along end portions of the display panel 110, the backlight unit BLU, and the bottom plate 170 to cover the end portions of the display panel 110, the backlight unit BLU, and the bottom plate 170.

The frames FR1 to FR4 may include a first frame FR1, a second frame FR2, a third frame FR3, and a fourth frame FR4. The first frame FR1 may be disposed at the upper portions of the display panel 110, the backlight unit BLU, and the bottom plate 170 to cover a predetermined area of the upper portions of the display panel 110, the backlight unit BLU, and the bottom plate 170. The second frame FR2 may be disposed at the lower portions of the display panel 110, the backlight unit BLU, and the bottom plate 170 to cover a predetermined area of the lower portions of the display panel 110, the backlight unit BLU, and the bottom plate 170. The third frame FR3 may be disposed at left portions of the display panel 110, the backlight unit BLU, and the bottom plate 170 to cover a predetermined area of the left portions of the display panel 110, the backlight unit BLU, and the bottom plate 170. The fourth frame FR4 may be disposed at right portions of the display panel 110, the backlight unit BLU, and the bottom plate 170 to cover a predetermined area of the right portions of the display panel 110, the backlight unit BLU, and the bottom plate 170.

Each of the first frame FR1 to the fourth frame FR4 may include a first rail RA1, a second rail RA2, and a third rail RA3, which are extended to correspond to the end portions of the display panel 110, the backlight unit BLU, and the bottom plate 170, and a surface of each of the first to fourth frames FR1 to FR4 is inwardly recessed therefrom, which is adjacent to the display panel 110, the backlight unit BLU, and the bottom plate 170. A predetermined area of the end portion of the display panel 110 may be inserted into the first rail RA1. A predetermined area of the end portions of the optical sheet 130 and the diffusion plate 140, which are coupled to each other by the fixing clips FC, may be inserted into the second rail RA2. A predetermined area of the end portion of the bottom plate 170 may be inserted into the third rail RA3. The light source board 160 on which the reflective sheet 150 and the light source units LSU are formed may be disposed between the diffusion plate 140 and the bottom plate 170.

The first frame FR1 and the second frame FR2 are extended in the second direction X2 and have the same curvature as that of the display panel 110. That is, the first and second frames FR1 and FR2 may be formed to have the same curved shape as the display panel 110, the backlight unit BLU, and the bottom plate 170. Thus, the first rails RA1 to the third rail RA3 of the first frame FR1 and the second frame FR2 have the curved shape and are extended in the second direction X2.

The first frame FR1 and the second frame FR2 have a length shorter than a length of the upper and lower portions of the display panel 110, the backlight unit BLU, and the bottom plate 170 in the second direction X2. Both ends of each of the first rail RA1 to the third rail RA3 of the first frame FR1 and the second frame FR2 may be opened.

The predetermined area of the upper portion of the display panel 110 is inserted into the first rail RA1 of the first frame FR1. Although not shown in figures, the display panel 110 may include a display area in which the image is displayed and a non-display area, in which the image is not displayed, disposed adjacent to the display area. That is, the non-display area is disposed adjacent to the upper, lower, left, and right portions of the display area. The non-display area of the upper portion of the display panel 110 may be inserted into the first rail RA1.

The predetermined area of the lower portions of the source driver chips 122, the flexible printed circuit boards 123, the driving circuit board 124, and the display panel 110 may be inserted into the first rail RA1 of the second frame FR2. The non-display area of the lower portions of the display panel 110 may be inserted into the first rail RA1 of the second frame FR2.

The predetermined area of the upper portions of the optical sheet 130 and the diffusion plate 140, which are coupled to the fixing clips FC, may be inserted into the second rail RA2 of the first frame FR1. The predetermined area of the lower portions of the optical sheet 130 and the diffusion plate 140, which are coupled to the fixing clips FC, may be inserted into the second rail RA2 of the second frame FR2.

The optical sheet 130 is expanded and contacted in accordance with the temperature thereof. In order to secure a space in which the optical sheet 130 is expanded, the upper portions of the optical sheet 130 and the diffusion plate 140 coupled to each other by the fixing clips FC do not make contact with an upper surface inside the second rail RA2 of the first frame FR1. For example, the optical sheet 130 and the diffusion plate 140 coupled to each other by the fixing clips FC may be inserted into the second rail RA2 of the first frame FR1 to allow the predetermined area of the upper portions of the optical sheet 130 and the diffusion plate 140 to be spaced apart from the upper surface inside the second rail RA2 of the first frame FR1 by a predetermined distance. In addition, the lower portions of the optical sheet 130 and the diffusion plate 140 coupled to each other by the fixing clips FC do not make contact with a lower surface inside the second rail RA2 of the second frame FR2. For example, the optical sheet 130 and the diffusion plate 140 coupled to each other by the fixing clips FC may be inserted into the second rail RA2 of the second frame FR2 to allow the predetermined area of the lower portions of the optical sheet 130 and the diffusion plate 140 to be spaced apart from the lower surface inside the second rail RA2 of the second frame FR2 by a predetermined distance.

In some examples, a predetermined area of the upper portion of the bottom plate 170 may be inserted into the third rail RA3 of the first frame FR1, and a predetermined area of the lower portion of the bottom plate 170 may be inserted into the third rail RA3 of the second frame FR2.

The third frame FR 3 and the fourth frame FR4 are extended substantially in parallel to the first direction X1. That is, the third frame FR 3 and the fourth frame FR4 do not have the curved shape. The third frame FR 3 and the fourth frame FR4 have a length longer than a length of each of the left and right portions of the display panel 110, the backlight unit BLU, and the bottom plate 170 in the first direction X1.

A predetermined area of the left portions of the driving circuit board 124 and the display panel 110 may be inserted into the first rail RA1 of the third frame FR3. A gate driving circuit is disposed in the non-display area of the left portion of the display panel 110, and the non-display area of the left portion of the display panel 110 may be inserted into the first rail RA1 of the third frame FR3.

A predetermined area of the right portion of the display panel 110 may be inserted into the first rail RA1 of the fourth frame FR4. The non-display area of the right portion of the display panel 110 may be inserted into the first rail RA1 of the fourth frame FR4.

A predetermined area of the left portions of the optical sheet 130 and the diffusion plate 140 may be inserted into the second rail RA2 of the third frame FR3. A predetermined area of the right portions of the optical sheet 130 and the diffusion plate 140 may be inserted into the second rail RA2 of the fourth frame FR4. The optical sheet 130 is expanded and contacted by the temperature thereof. In order to secure the space in which the optical sheet 130 is expanded, the left portions of the optical sheet 130 and the diffusion plate 140 do not make contact with a left surface inside the second rail RA2 of the third frame FR3 so as to allow the predetermined area of the left portions of the optical sheet 130 and the diffusion plate 140 to be spaced apart from the left surface inside the second rail RA2 of the third frame FR3 by a predetermined distance. In addition, the right portions of the optical sheet 130 and the diffusion plate 140 do not make contact with a right surface inside the second rail RA2 of the fourth frame FR4 so as to allow the predetermined area of the right portions of the optical sheet 130 and the diffusion plate 140 to be spaced apart from the right surface inside the second rail RA2 of the fourth frame FR4 by a predetermined distance.

A predetermined area of the left portion of the bottom plate 170 is inserted into the third rail RA3 of the third frame FR3 and a predetermined area of the right portion of the bottom plate 170 is inserted into the third rail RA3 of the fourth frame FR4.

The optical sheet 130 may be expanded by the heat generated when the liquid crystal display apparatus 100 is operated. Therefore, when the optical sheet 130 is not fixed, the optical sheet 130 is sagged or wrinkled. As described above, however, the fixing clips FC are coupled to the diffusion plate 140 having rigidity and the optical sheet 130 is coupled to the fixing clips FC. Thus, the optical sheet 130 may be fixed by the fixing clips FC.

Consequently, the liquid crystal display apparatus 100 may prevent the optical sheet 130 from being wrinkled.

According to the present exemplary embodiments, the first frame FR1 and the second frame FR2 have the curved shape, but they should not be limited thereto or thereby. That is, the third frame FR 3 and the fourth frame FR4 may have the curved shape. In addition, the length of the first frame FR1 and the second frame FR2 in the second direction X2 is shorter than that of the upper portion and the lower portion of the display panel 110, but it should not be limited thereto or thereby. That is, the length of the third frame FR 3 and the fourth frame FR4 may be shorter than that of the upper portion and the lower portion of the display panel 110.

Figure 2A:
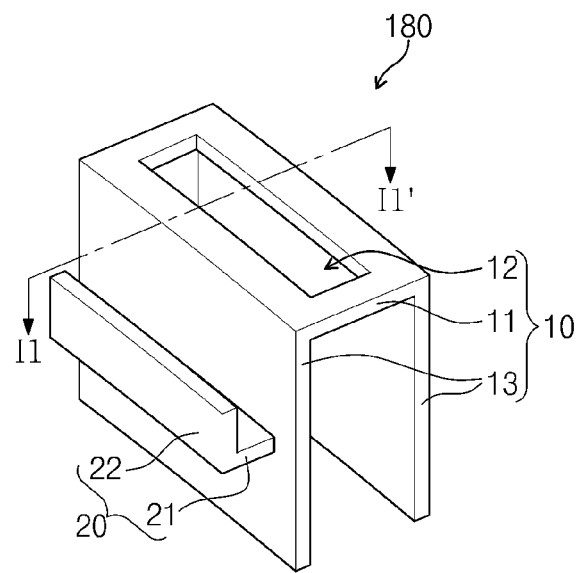
FIG. 2A is an enlarged perspective view showing a fixing clip shown in FIG. 1.
Figure 2B:
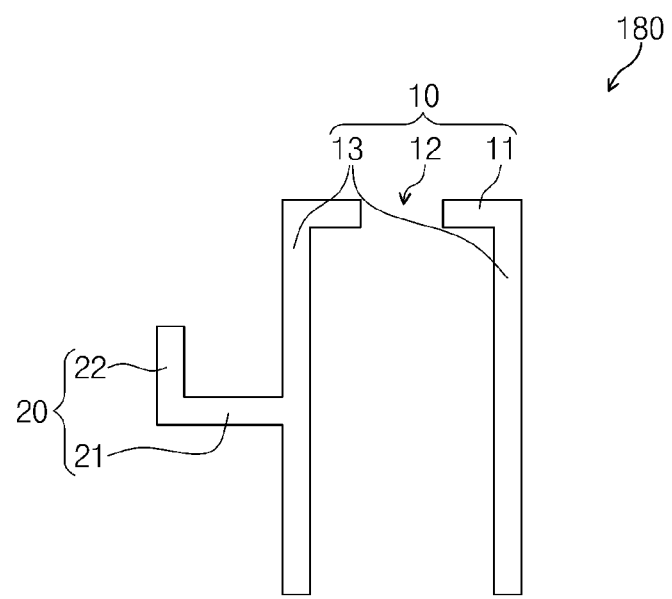
FIG. 2B is a cross-sectional view taken along a line I1-I1' shown in FIG. 2A.

FIG. 2A is an enlarged perspective view showing the fixing clip shown in FIG. 1 and FIG. 2B is a cross-sectional view taken along a line I1-I1' shown in FIG. 2A.

According to the present exemplary embodiments, the fixing clips FC have the same structure and function, and thus for the convenience of explanation, only one fixing clip has been exemplarily shown in FIGS. 2A and 2B for an illustration purpose. In detail, FIGS. 2A and 2B show the fixing clip coupled to the upper portion of the diffusion plate.

Referring to FIGS. 2A and 2B, the fixing clip FC includes a diffusion plate fixing part 10 coupled to the corresponding protrusion 141 and a sheet fixing part 20 extended from the diffusion plate fixing part 10 and inserted into the corresponding first engaging hole 131.

For example, the diffusion plate fixing part 10 may include a first diffusion plate fixing portion 11, a second engaging hole 12, and a pair of second diffusion plate fixing portions 13.

The first diffusion plate fixing portion 11 is extended in the same direction in which the upper portion of the diffusion plate 140 is extended and makes contact with the upper side surface of the diffusion plate 140. The second engaging hole 12 is formed through a center portion of the first diffusion plate fixing portion 11 and has the same shape as an upper surface of the corresponding protrusion 141. The second diffusion plate fixing portions 13 are extended in a direction vertical to the first diffusion plate fixing portion 11 from both end portions of the first diffusion plate fixing portion 11, which and face each other.

The sheet fixing part 20 may include a first sheet fixing portion 21 and a second sheet fixing portion 22. The first sheet fixing portion 21 is extended in a direction parallel to the first diffusion plate fixing portion 11 and vertical to the second diffusion plate fixing portions 13 from a plane surface of any one of the second diffusion plate fixing portions 13. For instance, the first sheet fixing portion 21 is extended from the plane surface of the second diffusion plate fixing portion 13 positioned at a left side to be parallel to the first diffusion plate fixing portion 11 and vertical to the second diffusion plate fixing portion 13 as shown in FIGS. 2A and 2B.

The second sheet fixing portion 22 is extended in a direction vertical to the first sheet fixing portion 21 from an end portion of the first sheet fixing portion 21 toward the first diffusion plate fixing portion 11.

Figure 3A:
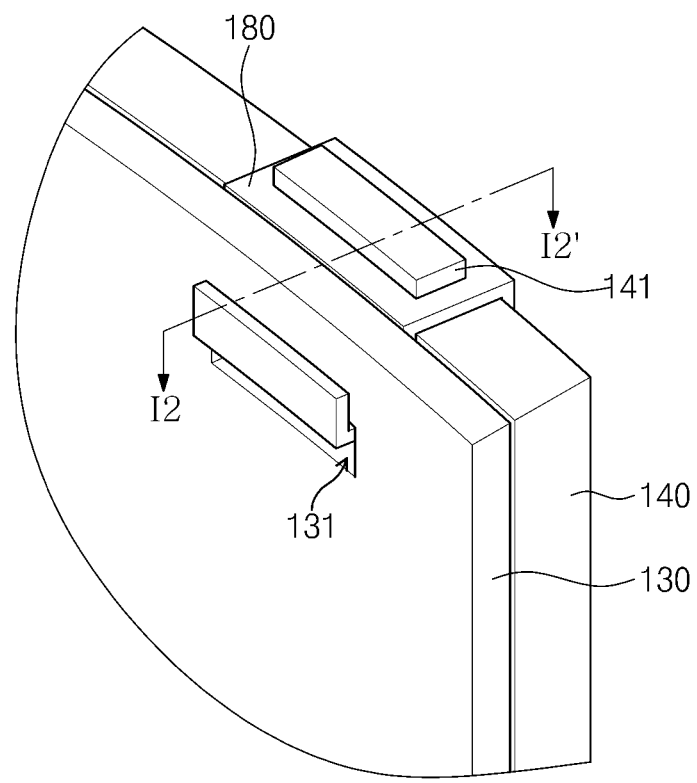
FIG. 3A is a perspective view showing the fixing clip coupled with a diffusion plate and an optical sheet.
Figure 3B:
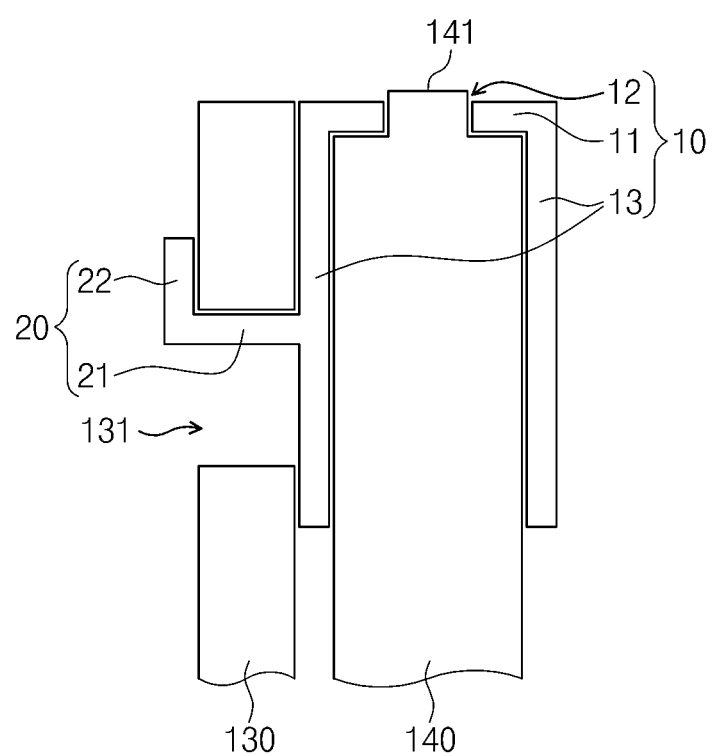
FIG. 3B is a cross-sectional view taken along a line I2-I2' shown in FIG. 3A.

FIG. 3A is a perspective view showing the fixing clip coupled with a diffusion plate and an optical sheet and FIG. 3B is a cross-sectional view taken along a line I2-I2' shown in FIG. 3A.

Referring to FIGS. 3A and 3B, the diffusion plate 140 is coupled to the diffusion plate fixing part 10 of the fixing clip FC. In detail, the corresponding protrusion 141 is inserted into the second engaging hole 12. The protrusion 141 has a height greater than a depth of the second engaging hole 12, but it should not be limited thereto or thereby. That is, the height of the protrusion 141 may be equal to or smaller than the depth of the second engaging hole 12 by way of configurations.

The height of the protrusion 141 is defined by a distance between the upper surface of the protrusion 141 and the upper side surface of the diffusion plate 140 on which the protrusion 141 is formed. The depth of the second engaging hole 12 is defined by a distance between upper and lower surfaces of the first diffusion plate fixing portion 11 through which the second engaging hole 12 is formed. When the height of the protrusion 141 is greater than the depth of the second engaging hole 12, the protrusion 141 inserted into the second engaging hole 12 is projected out through the second engaging hole 12. An inner side surface of the first diffusion plate fixing portion 11 makes contact with the upper side surface of the diffusion plate 140.

Inner side surfaces of the second diffusion plate fixing portions 13, which face each other, respectively contact an upper plane surface of the diffusion plate 140, which is defined as a front surface facing the optical sheet 130, and a lower plane surface of the diffusion plate 140, which is defined as a rear surface facing the light sources LS.

The optical sheet 130 is coupled to the sheet fixing part 20 of the fixing clip FC. For example, the second sheet fixing portion 22 of the fixing clip FC is inserted into the first engaging hole 131 of the optical sheet 130. The optical sheet 130 moves downwardly, and thus the first sheet fixing portion 21 makes contact with a portion of the optical sheet 130, which defines the first engaging hole 131 of the optical sheet 130. That is, the upper side surface defining the first engaging hole 131 makes contact with the upper side surface of the first sheet fixing portion 21. In addition, an inner side surface of the second sheet fixing portion 22 and an outer side surface of the second diffusion plate fixing portion 13, which face each other, make contact with the upper plane surface and the lower plane surface of the optical sheet 130 between the first engaging hole 131 and the upper portion of the optical sheet 130. The upper plane surface of the optical sheet 130 may be defined as a front surface facing the display panel 110 and the lower plane surface of the optical sheet 130 may be defined as a rear surface facing the diffusion plate 140.

Although not shown in figures, in some examples, the other protrusions 141 of the diffusion plate 140 are coupled to the diffusion plate fixing parts 10 of the corresponding fixing clips FC, respectively, and the other first engaging holes 131 are coupled to the sheet fixing parts 20 of the corresponding fixing clips FC, respectively.

The fixing clips FC are coupled to the diffusion plate 140 having rigidity and the optical sheet 130 is coupled to the fixing clips FC. As described above, since the optical sheet 130 may be fixed by the fixing clips FC, the liquid crystal display apparatus 100 may prevent the optical sheet 130 from being wrinkled.

Figure 4:
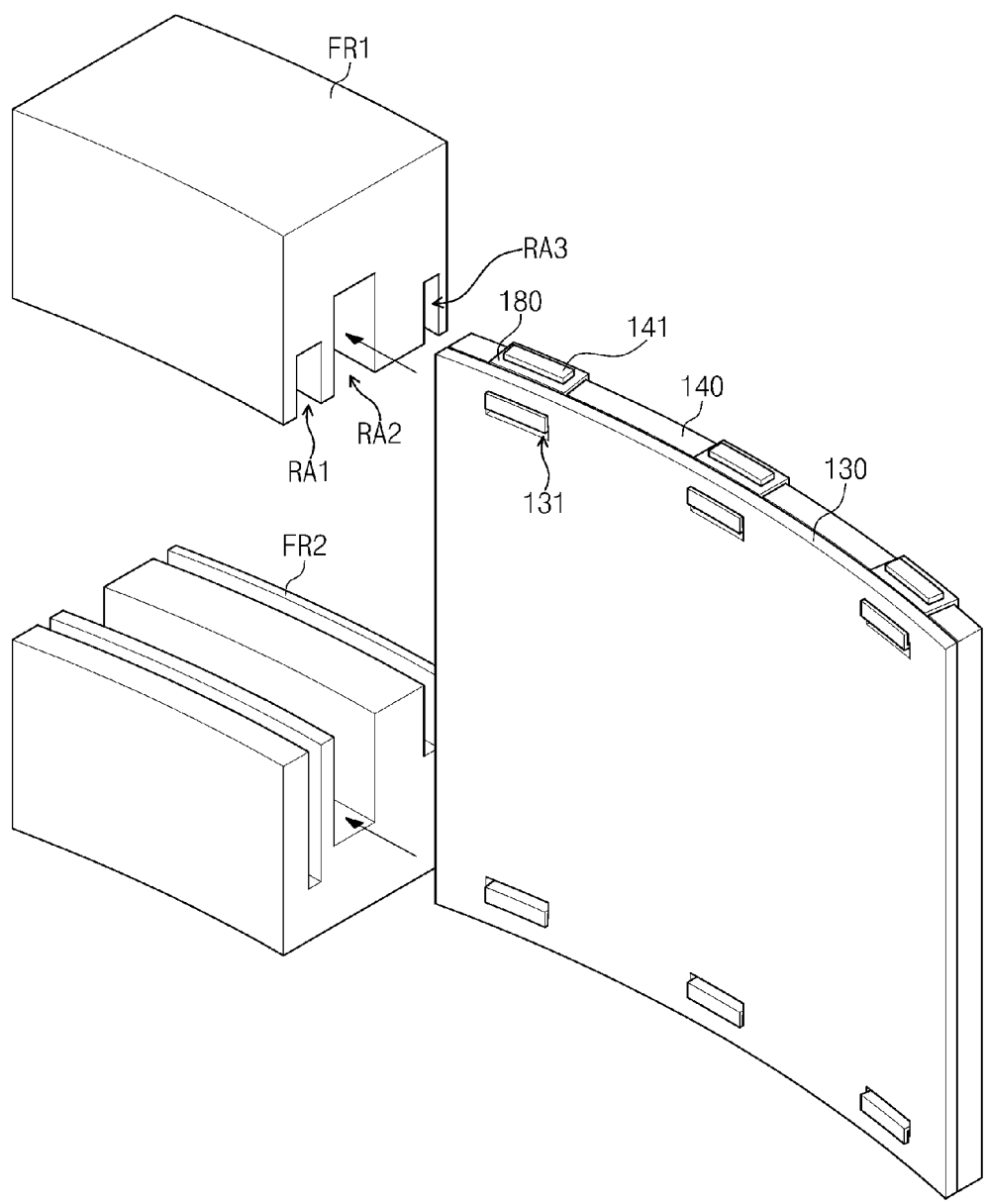
FIG. 4 is a perspective view showing a plurality of fixing clips shown in FIG. 1, which are coupled with a diffusion plate and an optical sheet.

FIG. 4 is a perspective view showing the fixing clips shown in FIG. 1, which are coupled to the diffusion plate and the optical sheet.

Referring to FIG. 4, for example, the upper and lower portions of the diffusion plate 140 are coupled to the fixing clips FC and the upper and lower portions of the optical sheet 130 are coupled to the fixing clips FC. The coupling configuration of the optical sheet 130, the diffusion plate 140, and the fixing clips FC is the same as the above-mentioned description and the same description may be omitted to avoid unnecessarily obscuring the present invention.

The predetermined area of the upper portion of the optical sheet 130 and the diffusion plate 140, which are coupled to the fixing clips FC, is inserted into the second rail RA2 of the first frame FR1. The predetermined area of the lower portion of the optical sheet 130 and the diffusion plate 140, which are coupled to the fixing clips FC, is inserted into the second rail RA2 of the second frame FR2. Thus, the first frame FR1 and the second frame FR2 cover the upper portion and the lower portion of the optical sheet 130 and the diffusion plate 140, respectively.

Figure 5:
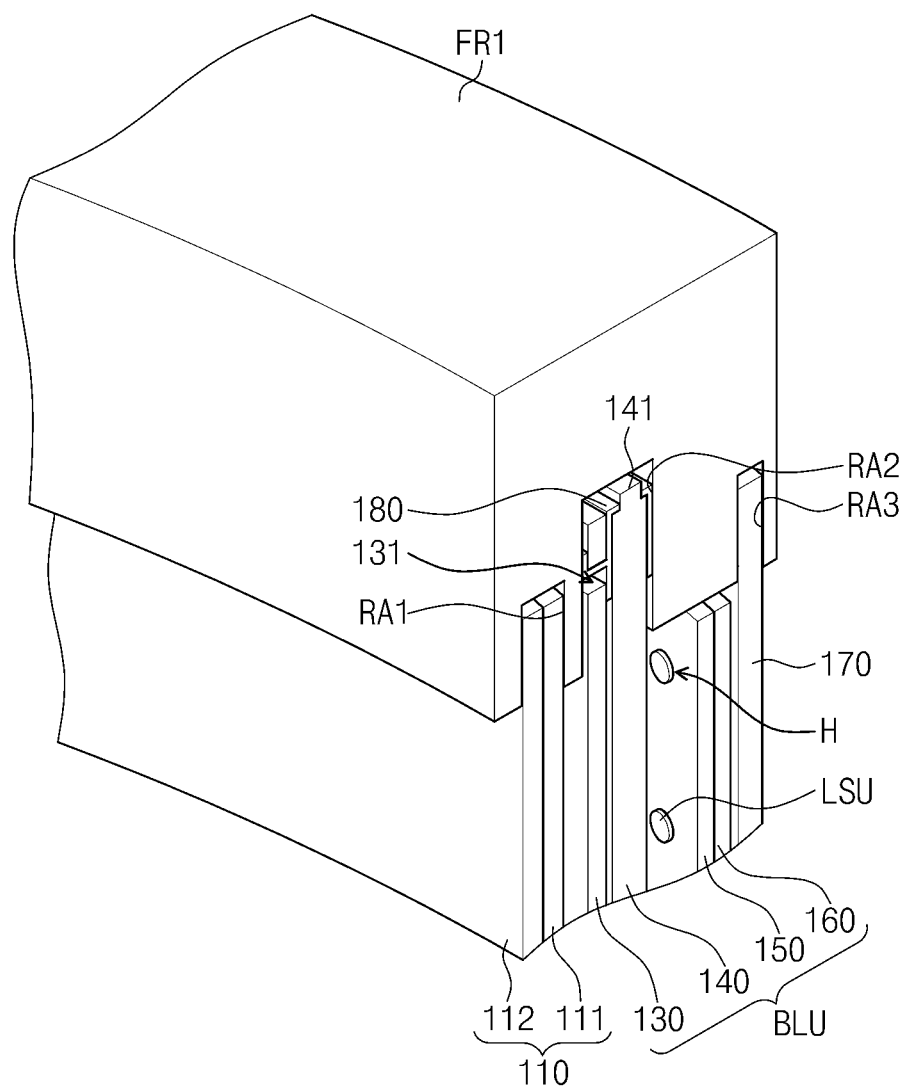
FIG. 5 is a perspective view showing a display panel, a backlight unit, and a bottom plate shown in FIG. 1, which are coupled to a first frame.

FIG. 5 is a perspective view showing the display panel, the backlight unit, and the bottom plate shown in FIG. 1, which may be coupled to the first frame.

The predetermined area of the upper portion of the display panel 110 is inserted into the first rail RA1 of the first frame FR1. The predetermined area of the upper portions of the optical sheet 130 and the diffusion plate 140, which are coupled to the fixing clips FC, is inserted into the second rail RA2 of the first frame FR1. The predetermined area of the upper portion of the bottom plate 170 is inserted into the third rail RA3 of the first frame FR1. The light sources LS, the reflective sheet 150, and the light source board 160 are disposed between the diffusion plate 140 and the bottom plate 170. Due to the structure, the fixing clips FC are coupled to the diffusion plate 140 having the rigidity and the optical sheet 130 is coupled to the fixing clips FC. Further, in some exemplary embodiments, as shown in FIG. 5, the fixing clips FC may contact the first frame FR1 at, for example, the second diffusion plate fixing portions 13 and the second sheet fixing portions 22. Moreover, although not shown in FIG. 5, the protrusions 141 may also contact the first frame FR1. Similar configurations would apply to the fixing clips FC in the second frame FR2.

Consequently, the optical sheet 130 may be fixed by the fixing clips FC, and thus the liquid crystal display apparatus 100 may prevent the optical sheet 130 from being wrinkled.

Figure 6A:
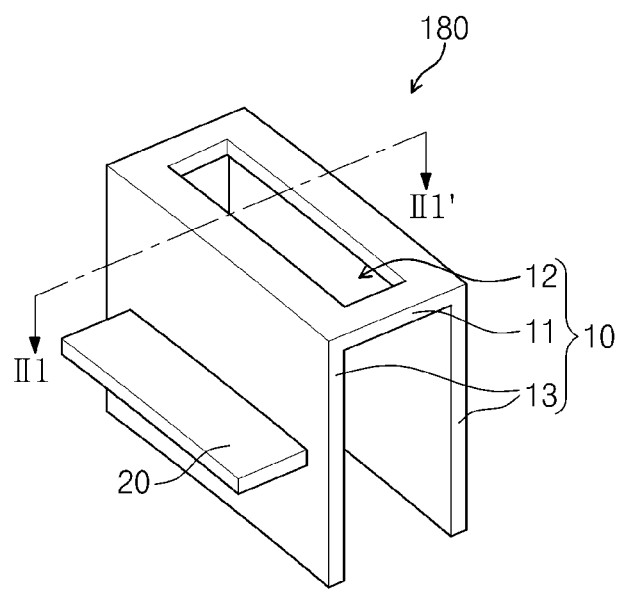
FIG. 6A is a perspective view showing a fixing clip of a liquid crystal display apparatus according to exemplary embodiments of the present invention.
Figure 6B:
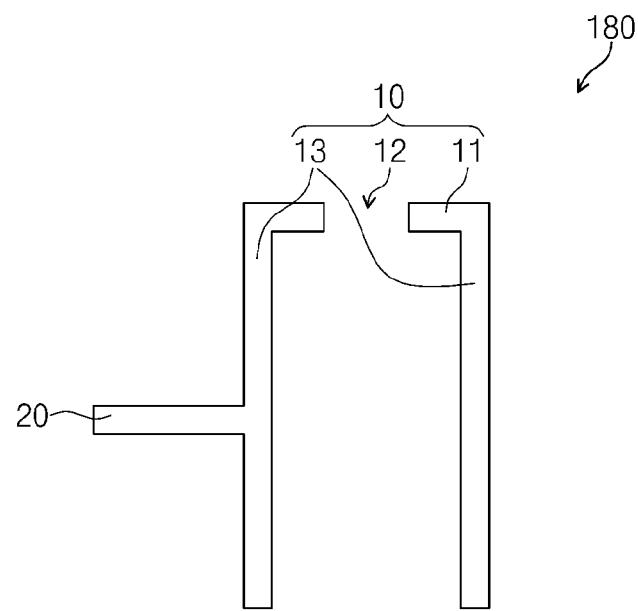
FIG. 6B is a cross-sectional view taken along a line II1-II1' shown in FIG. 6A.

FIG. 6A is a perspective view showing a fixing clip of a liquid crystal display apparatus according to exemplary embodiments of the present disclosure and FIG. 6B is a cross-sectional view taken along a line II1-II1' shown in FIG. 6A.

In the present exemplary embodiments, the liquid crystal display apparatus has the same structure and function as those of the liquid crystal display device shown in FIG. 1 except for the fixing clip and the first frame. Therefore, in FIGS. 6A and 6B, the same reference numerals denote the same elements in FIGS. 1 to 5, and thus detailed descriptions of the same elements will be omitted to avoid unnecessarily obscuring the present invention. The fixing clip will be described in detail with reference to FIGS. 6A and 6B, and the first frame will be described in detail with reference to FIG. 8.

Referring to FIGS. 6A and 6B, the fixing clip FC includes a diffusion plate fixing part 10 and a sheet fixing part 20 extended from the diffusion plate fixing part 10. The diffusion plate fixing part 10 has the same structure as that of the diffusion plate fixing part 10 shown in FIGS. 2A and 2B, and thus detailed description of the diffusion plate fixing part 10 will be omitted in order to avoid unnecessarily obscuring the present invention.

The sheet fixing part 20 is extended in a direction parallel to the first diffusion plate fixing portion 11 and vertical to the second diffusion plate fixing portions 13 from a plane surface of any one of the second diffusion plate fixing portions 13. For instance, the sheet fixing part 20 is extended from the plane surface of the second diffusion plate fixing portion 13 positioned at the left side to be parallel to the first diffusion plate fixing portion 11 and vertical to the second diffusion plate fixing portion 13 as shown in FIGS. 6A and 6B.

Figure 7A:
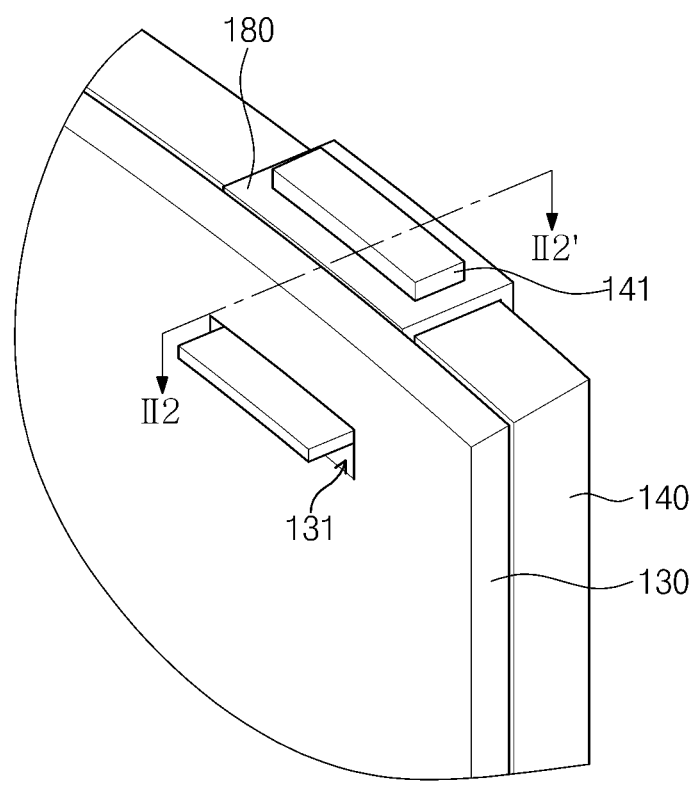
FIG. 7A is a perspective view showing the fixing clip shown in FIG. 6A, which is coupled with a diffusion plate and an optical sheet.
Figure 7B:
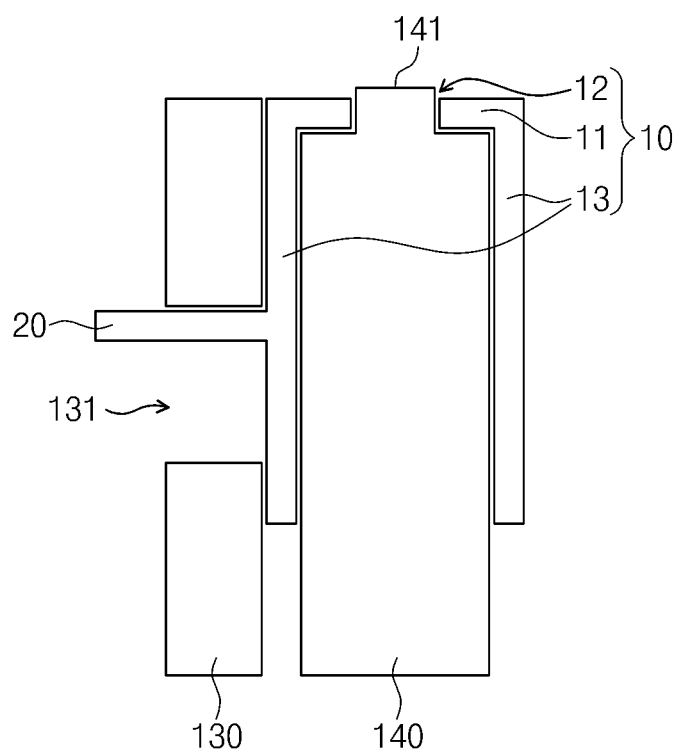
FIG. 7B is a cross-sectional view taken along a line II2-II2' shown in FIG. 7A.

FIG. 7A is a perspective view showing the fixing clip shown in FIG. 6A, which is coupled with the diffusion plate and the optical sheet and FIG. 7B is a cross-sectional view taken along a line II2-II2' shown in FIG. 7A.

Referring to FIGS. 7A and 7B, the diffusion plate 140 is coupled to the diffusion plate fixing part 10 of the fixing clip FC. The coupling configuration between the diffusion plate 140 and the diffusion plate fixing part 10 of the fixing clip FC is the same as that between the diffusion plate 140 and the diffusion plate fixing part 10 of the fixing clip FC shown in FIGS. 3A and 3B, and thus detailed description of the coupling configuration between the diffusion plate 140 and the diffusion plate fixing part 10 of the fixing clip FC will be omitted to avoid unnecessarily obscuring the present invention.

The optical sheet 130 is coupled to the sheet fixing part 20 of the fixing clip FC. For example, the sheet fixing part 20 of the fixing clip FC is inserted into the first engaging hole 131 of the optical sheet 130.

Figure 8:
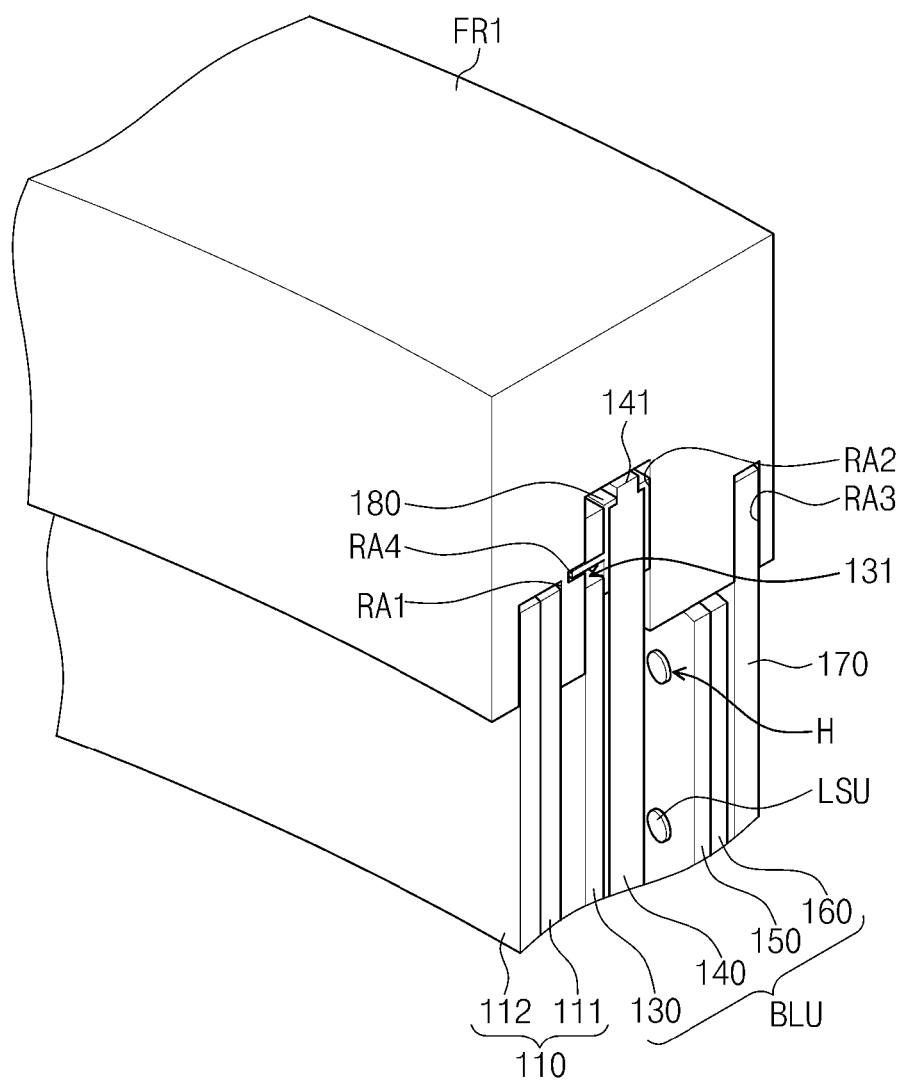
FIG. 8 is a perspective view showing a display panel, a backlight unit, and a bottom plate coupled with a first frame according to exemplary embodiments of the present invention.

FIG. 8 is a perspective view showing a display panel, a backlight unit, and a bottom plate coupled with a first frame according to exemplary embodiments of the present disclosure.

Referring to FIG. 8, a first frame FR1 includes a first rail RA1, a second rail RA2, a third rail RA3, and a fourth rail RA4. The first rail RA1 to the third rail RA3 of the first frame FR1 have the same structure as that of the first rail RA1 to the third rail RA3 of the first frame FR1 shown in FIG. 5.

The fourth rail RA4 is formed by inwardly recessing an inner side surface of the second rail RA2 to a direction vertical to a direction in which the second rail RA2 is recessed. The fourth rail RA4 may have the curved shape as that of the second rail RA2.

The predetermined area of the upper portion of the display panel 110 is inserted into the first rail RA1 of the first frame FR1. The predetermined area of the optical sheet 130 and the diffusion plate 140, which are coupled to the fixing clip FC, is inserted into the first frame FR1. The sheet fixing part 20 of the fixing clip FC is inserted into the fourth rail RA4 of the first frame FR1.

The predetermined area of the upper portion of the bottom plate 170 is inserted into the third rail RA3 of the first frame FR1. The reflective sheet 150 and the light source board 160 on which the light source unit LSU is formed are disposed between the diffusion plate 140 and the bottom plate 170.

Although not shown in FIG. 8, a second frame FR2 include the first rail RA1, the second rail RA2, the third rail RA3, and the fourth rail RA4. The fourth rail RA4 of the second frame FR2 is formed by inwardly recessing an inner side surface of the second rail RA2 of the second frame FR2 to a direction vertical to a direction in which the second rail RA2 of the second frame FR2 is recessed. In addition, the sheet fixing part 20 of the fixing clip FC is inserted into the fourth rail RA4 of the second frame FR2. Due to the structure, the fixing clips FC are coupled to the diffusion plate 140 having the rigidity and the optical sheet 130 is coupled to the fixing clips FC. Further, in some exemplary embodiments, as shown in FIG. 8, the fixing clips FC may contact the first frame FR1 at, for example, the second diffusion plate fixing portions 13 and the second sheet fixing part 20. Moreover, although not shown in FIG. 8, the protrusions 141 may also contact the first frame FR1. Similar configurations would apply to the fixing clips FC in the second frame FR2.

Consequently, since the optical sheet 130 may be fixed by the fixing clips FC, the liquid crystal display apparatus 100 may prevent the optical sheet 130 from being wrinkled.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display apparatus comprising:
a display panel to display an image;
a backlight unit to provide a light to the display panel; and
a frame to accommodate the display panel and the backlight unit, the backlight unit comprising:
   a light source;
   a diffusion plate to diffuse the light from the light source, the diffusion plate comprising a protrusion extending from a side surface thereof vertical to a plane surface of the diffusion plate;
   an optical sheet to condense the diffused light and to provide the condensed light to the display panel, the optical sheet comprising a first engaging hole formed therethrough and disposed adjacent to an end portion of the optical sheet; and
   a clip configured to couple the diffusion plate and the optical sheet, the clip comprising a diffusion plate fixing part with a second engaging hole configured for receiving the protrusion, and a sheet fixing part extending from the diffusion plate fixing part and configured to engage the first engaging hole.

2. The liquid crystal display apparatus of claim 1, wherein the diffusion plate comprises a plurality of protrusions and the optical sheet comprises a plurality of first engaging holes formed therethrough, and wherein the protrusions respectively correspond to each of the first engaging holes and are disposed on an upper side surface and a lower side surface of the diffusion plate to be spaced apart from each other.

3. The liquid crystal display apparatus of claim 2, wherein the first engaging holes are disposed on an upper portion and a lower portion of a plane surface of the optical sheet to be spaced apart from each other.

4. The liquid crystal display apparatus of claim 3, wherein the clip comprises a plurality of fixing clips.

5. The liquid crystal display apparatus of claim 4, wherein the diffusion plate fixing part comprises:
   a first diffusion plate fixing portion extended in a same direction as the side surface of the diffusion plate and making contact with the upper side surface of the diffusion plate;
   the second engaging hole formed through a center portion of the first diffusion plate fixing portion and having a same shape as an upper surface of the corresponding protrusion of the protrusions; and
   a pair of second diffusion plate fixing portions respectively extended from end portions of the first diffusion plate fixing portions, which face each other, to a direction vertical to the first diffusion plate fixing portion, and inner side surfaces of the second diffusion plate fixing portions, which face each other, make respectively contact with an upper plane surface of the diffusion plate, which is defined as a front surface facing the optical sheet, and a lower plane surface of the diffusion plate, which is defined as a lower plane facing the light source.

6. The liquid crystal display apparatus of claim 4, wherein the sheet fixing part comprises:
   a first sheet fixing portion extended in a direction parallel to the first diffusion plate fixing portion and vertical to the second diffusion plate fixing portions from a plane surface of any one of the second diffusion plate fixing portions; and
   a second sheet fixing portion extended in a direction vertical to the first sheet fixing portion from an end portion of the first sheet fixing portion toward the first diffusion plate fixing portion.

7. The liquid crystal display apparatus of claim 6, wherein the first and second sheet fixing portions are inserted into the corresponding first engaging hole, an upper surface defining the corresponding first engaging hole makes contact with an upper surface of the first sheet fixing portion, and an inner side surface of the second sheet fixing portion and an outer side surface of the second diffusion plate fixing portion, which face each other, make respectively contact with an upper plane surface of the optical sheet, which is defined as a front surface facing the display panel, and a lower plane surface of the optical sheet, which is defined as a rear surface facing the diffusion plate.

8. The liquid crystal display apparatus of claim 4, further comprising:
   a reflective sheet to reflect the light from the light source to the diffusion plate; and
   a bottom plate disposed at a rear side of the reflective sheet.

9. The liquid crystal display apparatus of claim 8, wherein the frame comprises:
   a first frame disposed on an upper portion of the display panel, the backlight unit, and the bottom plate to cover a predetermined area of the upper portion of the display panel, the backlight unit, and the bottom plate;
   a second frame disposed on a lower portion of the display panel, the backlight unit, and the bottom plate to cover a predetermined area of the lower portion of the display panel, the backlight unit, and the bottom plate;
   a third frame disposed on a left portion of the display panel, the backlight unit, and the bottom plate to cover a predetermined area of the left portion of the display panel, the backlight unit, and the bottom plate; and
   a fourth frame disposed on a right portion of the display panel, the backlight unit, and the bottom plate to cover a predetermined area of the right portion of the display panel, the backlight unit, and the bottom plate.

10. The liquid crystal display apparatus of claim 9, wherein each of the first frame, the second frame, the third frame, and the fourth frame comprises first rail, second rail, and third rail formed by inwardly recessing an inner side surface of the first rail, the second rail, and the third rail, which is adjacent to the display panel, the backlight unit, and the bottom plate, and extended to correspond to the end portions of the display panel, the backlight unit, and the bottom plate.

11. The liquid crystal display apparatus of claim 10, wherein the predetermined area of the end portion of the display panel is inserted into the first rail, the predetermined area of the end portion of the optical sheet and the diffusion plate is inserted into the second rail, the predetermined area of the end portion of the bottom plate is inserted into the third rail, and the reflective sheet and the light source are disposed between the diffusion plate and the bottom plate.

12. The liquid crystal display apparatus of claim 10, wherein the fixing clips are used to couple an upper portion of the diffusion plate and an upper portion of the optical sheet and a lower portion of the diffusion plate and a lower portion of the optical sheet, a predetermined area of the upper portion of the diffusion plate and the optical sheet is inserted into the second rail of the first frame, and a predetermined area of the lower portion of the diffusion plate and the optical sheet is inserted into the second rail of the second frame.

13. The liquid crystal display apparatus of claim 10, wherein both ends of each of the first rail, the second rail, the third rail of the first frame and the second frame are opened, and a length between the both ends of each of the first frame and the second frame in the direction in which the first frame and the second frame are extended is shorter than a length of each of the upper portion and the lower portion of the display panel, the backlight unit, and the bottom plate.

14. The liquid crystal display apparatus of claim 10, wherein both ends of each of the first rail, the second rail, the third rail of the third frame and the fourth frame are blocked, and a length between the both ends of each of the third frame and the fourth frame in the direction in which the third frame and the fourth frame are extended is longer than a length of each of the left portion and right portion of the display panel, the backlight unit, and the bottom plate.

15. The liquid crystal display apparatus of claim 10, wherein each of the first frame and the second frame further comprises a fourth rail formed by inwardly recessing an inner side surface of the second rail to a direction vertical to a direction in which the second rail is recessed.

16. The liquid crystal display apparatus of claim 15, wherein the diffusion plate fixing part comprises:
- a first diffusion plate fixing portion extended in a same direction as the side surface of the diffusion plate and making contact with the upper side surface of the diffusion plate;
- a second engaging hole formed through a center portion of the first diffusion plate fixing portion and having a same shape as an upper surface of the corresponding protrusion of the protrusions; and
- a pair of second diffusion plate fixing portions respectively extended from end portions of the first diffusion plate fixing portions, which face each other, to a direction vertical to the first diffusion plate fixing portion, and the sheet fixing part is extended in a direction parallel to the first diffusion plate fixing portion and vertical to the second diffusion plate fixing portions from a plane surface of any one of the second diffusion plate fixing portions and inserted into the corresponding first engaging hole.

17. The liquid crystal display apparatus of claim 16, wherein the sheet fixing part is inserted into the fourth rail.

18. The liquid crystal display apparatus of claim 1, wherein the display panel and the backlight unit have a curved shape, and a pair of frames facing each other among the frames has a curved shape corresponding to the curved shape of the display panel and the backlight unit.

19. The liquid crystal display apparatus of claim 1, wherein the optical sheet comprises:
- a diffusion sheet to diffuse the light exiting from the diffusion plate;
- a prism sheet disposed on the diffusion sheet to condense the light diffused by the diffusion sheet to allow the light to travel in a direction substantially vertical to the display panel; and
- a protective sheet disposed on the prism sheet to protect the prism sheet.

* * * * *